United States Patent [19]

Kobayashi

[11] Patent Number: 4,710,952

[45] Date of Patent: Dec. 1, 1987

[54] DISTRIBUTED CONTROL TYPE ELECTRONIC SWITCHING SYSTEM

[75] Inventor: Tsuneo Kobayashi, Tokyo, Japan

[73] Assignee: NEC Corporation, Tokyo, Japan

[21] Appl. No.: 829,039

[22] Filed: Feb. 13, 1986

[30] Foreign Application Priority Data

Feb. 13, 1985 [JP] Japan .................................. 60-25950
Aug. 8, 1985 [JP] Japan ................................ 60-174859

[51] Int. Cl.⁴ ........................ H04M 3/08; H04Q 3/56; H04Q 11/04
[52] U.S. Cl. ..................................... 379/269; 370/58; 379/9; 379/279; 379/290
[58] Field of Search ...................... 379/10, 9, 246, 269, 379/273, 274, 279, 290; 370/16, 58, 59, 63, 66

[56] References Cited

U.S. PATENT DOCUMENTS

4,382,294  5/1983  Beuscher et al. ...................... 370/16
4,455,645  6/1984  Mijioka et al. ........................ 370/16
4,484,323  11/1984 Beuscher et al. ...................... 370/58

*Primary Examiner*—Thomas W. Brown
*Attorney, Agent, or Firm*—Sughrue, Mion, Zinn, Macpeak & Seas

[57] ABSTRACT

The invention relates to a distributed control-type electronic switching system which includes a first group of processors paired for act/standby redundancy, and a second group of master processors which are provided as single units. The first group of processors is connected to the speech-path switches and line and trunk circuits of a telephone switching system while the second processor group controls the various connections for the speech-path switches and the line and trunk circuits. Data communications between the first group of processors and the second group of processors is achieved on a distributed basis such that each processor of the first group designates a subset of the second group of processors as potential receivers, and conducts communications with the first non-busy processor of the subset.

7 Claims, 7 Drawing Figures

FIG.5A
TRANSMISSION SEQUENCE

FIG. 5B
RECEPTION SEQUENCE

DISTRIBUTED CONTROL TYPE ELECTRONIC SWITCHING SYSTEM

BACKGROUND OF THE INVENTION

The present invention relates to a distributed control type electronic switching system and, more particularly, to a distributed control type electronic switching system provided with a plurality of processors that are redundantly structured.

Almost every prior electronic switching system has a centralized control subsystem which performs various control functions on a real time basis with a single centralized processor. However, such a switching system requires a substantial initial investment because it is equipped, from the outset of system installation, with a processor having a processing ability commensurate with the maximum number of lines to be accommodated.

In recent years, as the progress of semiconductor technology has made available for practical use smaller and less expensive general-purpose microprocessors, a linear-growth multiprocessor control subsystem, which can solve the problem of early electronic switching systems by the use of a plurality of microprocessors, can be readily structured. A multiprocessor control subsystem is known, in broad terminology, as a decentralized or distributed control subsystem as opposed to a centralized control subsystem having only one processor, and performs various switching functions in an electronic switching system ranging in capacity from very small to very large. One example of an electronic switching system having such a distributed control subsystem is disclosed in U.S. Pat. No. 4,210,782. In the system disclosed therein, each of the plural distributed signal control processors provided corresponding to the switching network, line circuit, and trunk circuit and which are required to accomplish their control on a real-time basis, is a single processor, so that if one of the signal processors runs into trouble, the corresponding call processing service will inevitably have to be suspended.

To solve this problem, a well known technique is to redundantly structure single devices including the processors. Processors can be redundantly structured by: (1) the "N+1" structure, by which one spare or standby processor is provided for a plurality of regular processors, or (2) the "ACT/STBY" structure, by which a standby processor is provided for every acting processor. These redundant structures can help improve the reliability of the system even in the event of trouble, but they inevitably tend to be uneconomical.

SUMMARY OF THE INVENTION

An object of the present invention, therefore, is to provide a distributed control type electronic switching system capable of selecting, in various switching processes such as call handling, trouble shooting and so forth, any desired one of all the redundantly structured processors built into the system.

Another object of the invention is to provide a distributed control type electronic switching system capable of evening the loads among a group-designated plurality of processors.

According to one aspect of the invention, there is provided a distributed control type electronic switching system which includes a plurality of speech-path switches respectively provided with duplicated first and second speech-path switching means operable simultaneously and accommodating line circuits and trunk circuits. The system includes a distributed first plurality of processors respectively provided with duplicated first and second processing means connected to the first and second speech-path switching means of each of the speech-path switches and to the line circuits and the trunk circuits associated with the corresponding speech-path switching means and arranged in active and standby operation states, respectively. Each of the processors is provided with duplicated first and second interface means respectively connected to the first and second processing means. Each of the processors also has means for reciprocally switching the active and standby operation states of the first and second processing means. The system includes a distributed second plurality of processors respectively provided with a single processing means and a single interface means for controlling various connections for the speech-path switches and the line circuits and the trunk circuits. The system also comprises transfer means connected to the first and second interface means of each of the first plurality of processors and the single interface means of each of the second plurality of processors for transmitting various information and data between the first and the second plurality of processors. In the system, each of the interface means of the first and the second plurality of processors comprises first storage means for storing own-processor-number-information, second storage means for storing own-processor-operation-state-information, third storage means for storing processor-number-information of a called party supplied by a calling party via the transfer means, and fourth storage means for storing processor-selection-condition-information of the called party supplied by the calling party via the transfer means. Each of the interface means comprises first comparison means for comparing the information stored in the first and third storage means with each other and second comparison means for comparing the information stored in the second and fourth storage means with each other. Each of the interface means comprises means for sending out either data-transfer-possible-information or data-transfer-impossible-information to the calling party via the transfer means depending on the comparison in the first and second comparison means, and means for sending out either data-transfer-normal-ending-information or data-transfer-abnormal-ending-information and for relaying the data transfer ending state to the corresponding processing means depending on the normality of data transmitted from the calling party. Each of the interface means further comprises fifth storage means for storing processor-number-information for designating the called party, sixth storage means for storing processor-selection-condition-information for selecting the called party, seventh storage means for storing either the data-transfer-possbile-information or the data-transfer-impossible-information sent back from the called party, and eighth storage means for storing either the data-transfer-normal-information or the data-transfer-abnormal-information sent back from the called party. Each of the interface means has means for effecting data transmission upon identifying the data-transfer-possible-information stored in the seventh storage means, and means for relaying the data-transfer-ending-state in the corresponding processing means depending on the identification of the data-transfer-normal-ending-information or the data-transfer-abnormal-ending-information stored in the eighth storage means.

BRIEF DESCRIPTION OF THE DRAWINGS

The above and other objects, features and advantages of the present invention may be fully understood from the following detailed description and the accompanying drawings, wherein.

In the drawings, identical reference numerals denote identical structural elements.

DESCRIPTION OF THE PREFERRED EMBODIMENT

Figure 1:
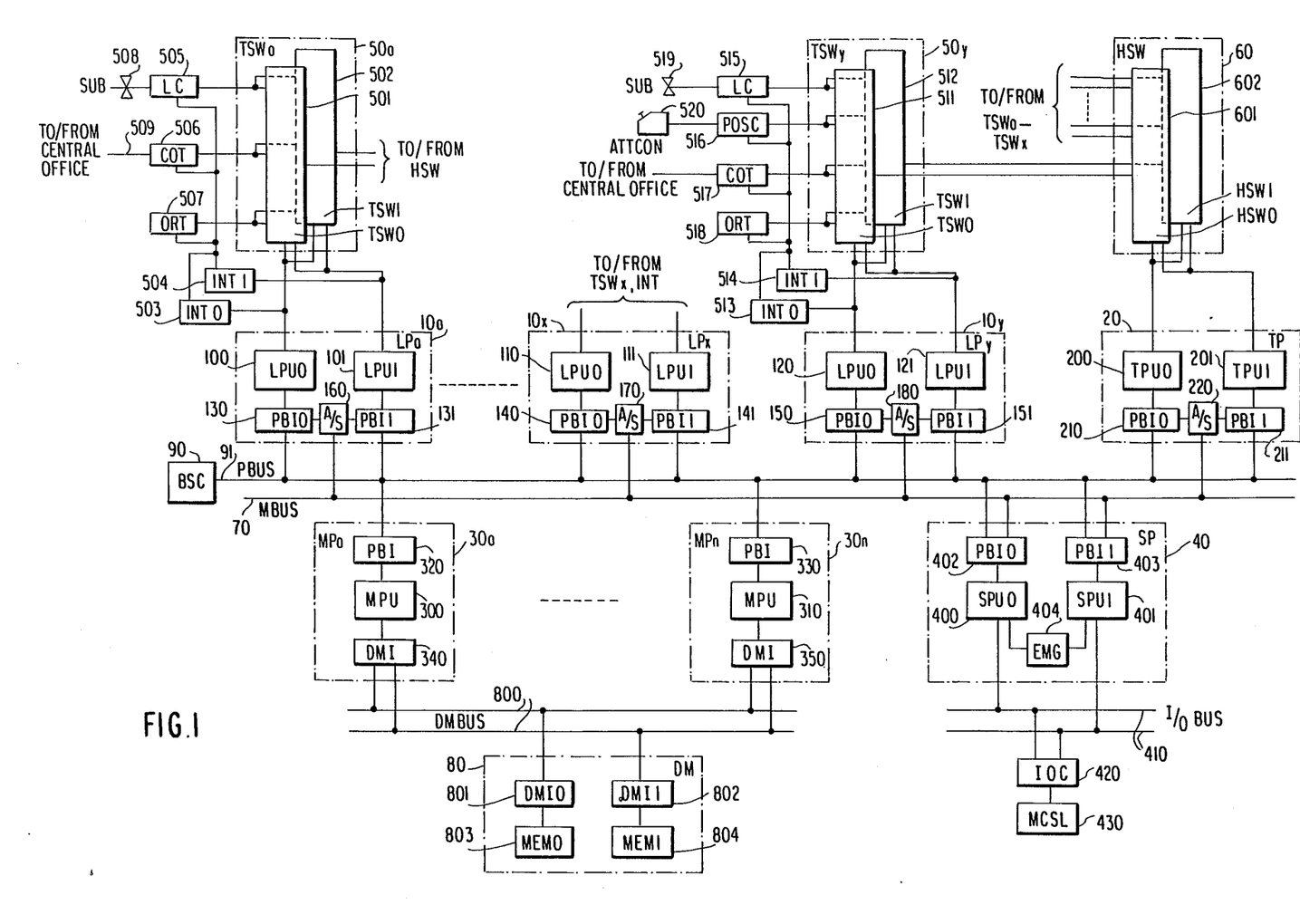
FIG. 1 is a block diagram of one embodiment of the invention.

Referring to FIG. 1, a distributed control type electronic switching system, which is a preferred embodiment of the present invention, is equipped with four different kinds of processors: a plurality of local processors (LPa to LPx and LPy) 10a to 10x and 10y, one time division switch processor (TP) 20, a plurality of main processors (MPa to MPn) 30a to 30n, and one system administration processor (SP) 40. These four kinds of processors, connected to one another by a common bus or processor bus (PBUS) 91, which is an information transfer means, constitute a distributed control subsystem for this switching system. The LPs 10a to 10x and 10y are processors having the same functions, detecting changes in the state of one or another of the line circuits (LCs) and trunk circuits (ORT and COT) associated with a time division switch (TSW), and depending on the corresponding superior processors $MP_a$-$MP_n$ for shifting the respective states of connection. The processors 10a to 10x and 10y are respectively provided with duplicated, or No. 0 and No. 1, local processor units (LPU0s and LPU1s) 100, 110, 120, 101, 111 and 121 and duplicated processor bus interface circuits (PBI0s and PBI1s) 130, 140, 150, 131, 141 and 151.

The No. 0 processor unit 100 and No. 1 processor unit 101 of the LP processor 10a are respectively connected to duplicated time division switches (TSW0 and TSW1) 501 and 502, and simultaneously control the speech-path switching of these switches. Accordingly, even if either switch 501 or 502 runs into trouble, the other can continue to process calls. The LPU units 100 and 101 are respectively connected via No. 0 and No. 1 interface circuits (INT0 and INT1) 503 and 504 to a line circuit (LC) 505, central office trunk circuit (COT) 506 and originating trunk circuit (ORT) 507 associated with the TSW switches 501 and 502. The LC circuit 505 is connected to a telephone terminal station (SUB) 508, and the COT circuit 506, to a central office or public telephone switching system (not shown) by way of a central office line 509. The No. 0 and No. 1 local processor units (LPU0 and LPU1) 110 and 111 of the local processor (LPx) 10x, though not shown, are connected, like those of the local processor (LPa) 10a, to corresponding time division switches (TSWx) and interface circuits (INT).

The No. 0 and No. 1 duplicated local processor units (LPU0 and LPU1) 120 and 121 of the local processor (LPy) 10y are respectively connected to duplicated time division switches (TSWy) 50y, and simultaneously control the speech-path switching of switches 511 and 512. The LPU units 120 and 121 are respectively connected via interface circuits (INT0 and INT1) 513 and 514 to a line circuit (LC) 515, position circuit (POSC) 516 and trunk circuits (CRT and ORT) 517 and 518 associated with the switches 511 and 512. The circuits 515, 516 and 517 are respectively connected to SUB station 519, attendant console (ATTCON) 520 and central office (not shown). The LP processors 10a to 10x and 10y are connected to the bus 91 respectively via PBI circuits 130, 131 to 140, 141, 150 and 151. The processors 10a to 10x and 10y are respectively equipped with act/standby switching circuits (A/Ss) 160, 161 to 170 and 180 for setting the duplicated local processor units (LPU0 and LPU1) 100, 101 to 110, 111, 120 and 121 in the active state ("ACT") or standby state ("STBY") in response to switching control information from the system administration processor 40 connected via a maintenance bus (MBUS) 70. The LP processors 10a to 10x and 10y are load-distributed processors, having the same control functions and controlling the corresponding time division switches, line circuits and trunk circuits independently of one another, and are function-distributed processors vis-a-vis the other processors 20, 30a to 30n and 40. The number of processors 10a to 10x and 10y can be increased according to the line capacity, which is gradually expanded from the time of initial installation on.

The time division switch processor (TP) 20 controls the speech-path switching of a space division switch or high-way switch (HSW) 60 according to control information from one of the MP processors 30a to 30n, which are superior processors. The TP processor 20 is equipped with duplicated, or No. 0 and No. 1, time division switch processor units (TPU0 and TPU1) 200 and 201 and duplicated processor bus interface circuits (PBI0 and PBI1) 210 and 211. Each of the TPU0 unit 200 and TPU1 unit 201 simultaneously controls the speech-path switching of duplicated HSW0 and HSW1 switches 601 and 602. The duplicated HSW switches 60, connected to the TSW switches 50a to 50y, constitute the second stage of T (time) − S (space) − T (time) division switches. The TP processor 20 is connected to the PBUS bus 91 by the PBI0 and PBI1 circuits 210 and 211, is functionally distributed vis-a-vis the other processors 10a to 10x and 10y, 30a to 30n and 40. The processor 20 is equipped with an act/standby switching circuit (A/S) 220 for setting the duplicated TPU0 and TPU1 units 200 and 201 in the "ACT" or "STBY" state in response to switching control information from the SP processor 40 connected via the MBUS bus 70.

The main processors (MPs) 30a to 30n are superior processors to the LP processors 10a to 10y and TP processor 20, and achieve a series of sequential procedures of state transition, for instance a dial tone connection procedure, according to demands from the processors 10a to 10y and 20. All of the MP processors 30a to 30n, having identical control functions, are load-distributed processors having an "N+1" redundant structure, and at the same time are functionally distributed vis-a-vis other processors. Each of the processors 30a to 30n is composed of single main processor units (MPUs) 300 to 310, processor bus interface circuits (PBIs) 320 to 330 connected to the PBUS bus 91, and data memory interface circuits (DMIs) 340 to 350 connected to a data memory (DM) 80 through a data memory bus (DMBUS) 800.

The system administration processor (SP) 40 is a functionally distributed processor, responsible for man-machine interfacing as well as overall system control. The SP processor 40 consists of duplicated, or #0 and #1, system processor units (SPU0 and SPU1) 400 and 401, duplicated processor bus interface circuits (PBI0 and PBI1) 402 and 403 connected to the buses 70 and 91, and an emergency circuit (EMG) 404. The EMG circuit 404 controls the switching of the SPU units 400 and 401 in the "ACT" and "STBY" operation states as the occurrence result of detecting a of trouble in the SP processor 40. Further the processor 40 is connected to a maintenance console (MCSL) 430 by way of an input/output bus (I/0 BUS) 410 and input-output control circuit (IOC) 420.

The data memory (DM) 80 for storing station data and office data is composed of duplicated data memory interface circuits (DMI0 and DMI1) 801 and 802, and duplicated memory units (MEM0 and MEM1) 803 and 804. The MEM0 unit 803 and MEM1 unit 804 operate in parallel in synchronization with each other. The DM memory 80 is accessible from the MP processors 30a to 30n on a time division basis.

The LP, TP, MP and SP processors mentioned above can transfer information among one another, commonly using the PBUS bus 91. A bus controller (BSC) 90 performs control to permit access to the bus on a time division basis to a processor demanding such information transfer. This control will be described in detail later on.

Figure 2:
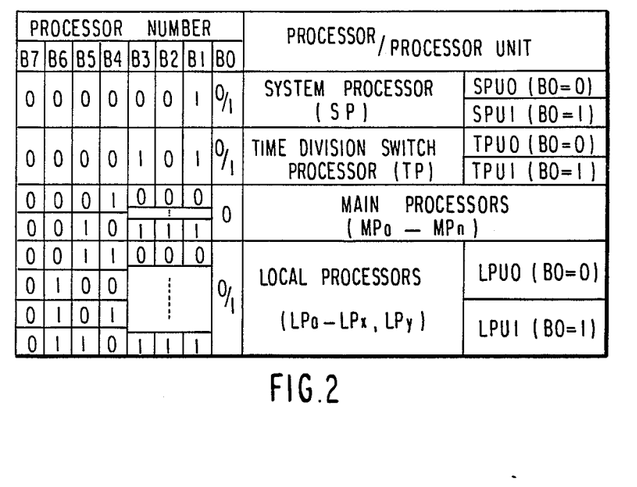
FIG. 2 shows one example of processor numbers assigned to the processors shown in FIG. 1.

Each of the processors, or more exactly each of the processor units, shown in FIG. 1 is assigned its own processor number. As is apparent from FIG. 2 which illustrates an example of processor number assignment, each processor number consists of eight bits (B0 to B7) of data. The example here shows the assignment of numbers to the SP processor and TP processor, sixteen MP processors and thirty-two local processors, though each of the LP, TP and SP processors having duplicated processor units is assigned two processor numbers, the No. 0 processor unit being designated when the value of the least significant bit (B0) is "0", and the No. 1 processor unit, when it is "1". The sixteen MP processors are classified in two groups depending on the value of the four more significant bits (B4 to B7). The thirty-two LP processors are also classified in four groups depending on the value thereof.

Figure 3:
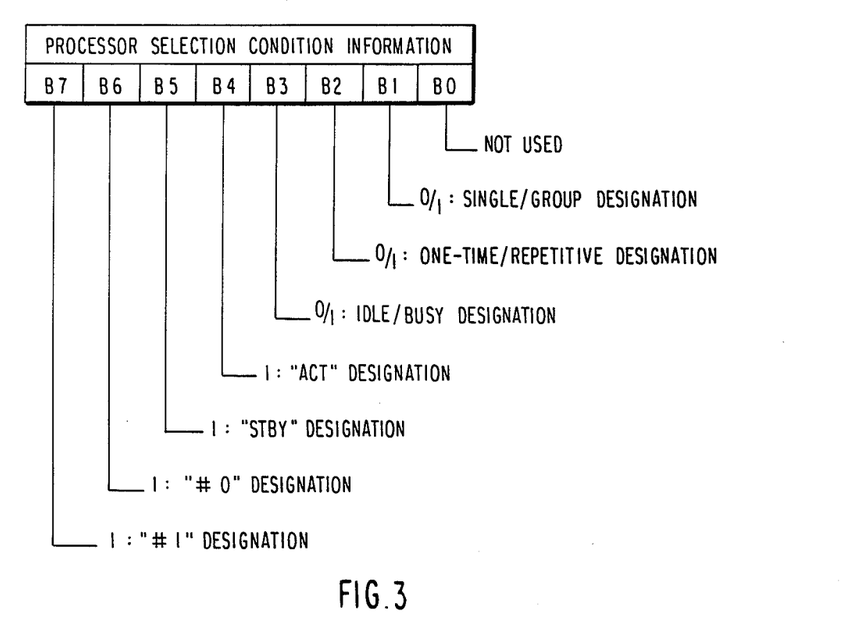
FIG. 3 shows one example of the processor selection conditions.

Further in the system of this embodiment, when processors transfer information among one another, eight-bits (B0 to B7) of condition information for processor selection as shown in FIG. 3 are transmitted so that the desired processor, to which information is to be transferred, can be selectively designated. The B0 bit is not used. The B1 bit signifies the designation of the other processor either as a single unit ("0") or in a group ("1"). Group designation here is used for selecting an idle processor among a given processor group having the same control functions. The processors for group designation have processor numbers whose four most significant bits (B4 to B7) are the same. The B2 bit signifies the designation of the called processor once ("0") or repeatedly ("1"). If the called processor is actuated by a one-time designation but cannot be reached because it is busy or other conditions are not met, the transfer will not be completed and the processing will be terminated. However, if the transmitting (calling) processor actuates the called processor by a repetitive designation but processing is terminated with the transfer incomplete, the bus actuation will be cancelled, but a bus request flag (BRQT) is sent again to gain access to the bus and begin a transfer sequence. The B1 and B2 bits are information which let the transmitting (calling) processor administer the control procedure within itself and prevent it from being sent to the other (called) processor. Next, the B3 bit signifies a non-engagement (idle) designation ("0") for selecting a called processor in an unengaged (idle) state or an engagement (busy) designation ("1") to selecting a called processor in an engaged (busy) state. The busy designation here is used to set in a busy state that called processor which has been reached by the first idle designation and to subsequently reach the same processor by busy designation for second and subsequent operations, and is effective for transferring a large quantity of information. The B4, B5, B6 and B7 bits are used for actuating processors having duplicated processor units. The B4 bit ("1") designates a processor unit which is currently in the "ACT" state; the B5 bit ("1"), a processor unit which is currently in the "STBY" state; the B6 bit ("1"), a "#0" processor unit, and the B7 bit ("1"), a "#1" processor unit. Since this embodiment of the invention uses a control subsystem of a fully distributed control form, if the receiving processor has duplicated processor units, the transmitting processor will not know, during the call processing step, which processor unit is currently in the "ACT" or "STBY" state. It will select the desired processor unit with the B4 to B7 bits. The B4 to B7 bits are also used for reaching another processor in a procedure other than call processing, for instance when the SP processor is to diagnose the system, to individually select one of the duplicated processor units. Further, since more than one of the B4 to B7 bits may be simultaneously set by software, there is set by hardware an order of priority in selection among these bits, that is, B4>B5>B6>B7, as will be described in detail later on. The B3 to B7 bits mentioned above are sent from the transmitting processor to the receiving processor as processor selection condition information.

Figure 4A:
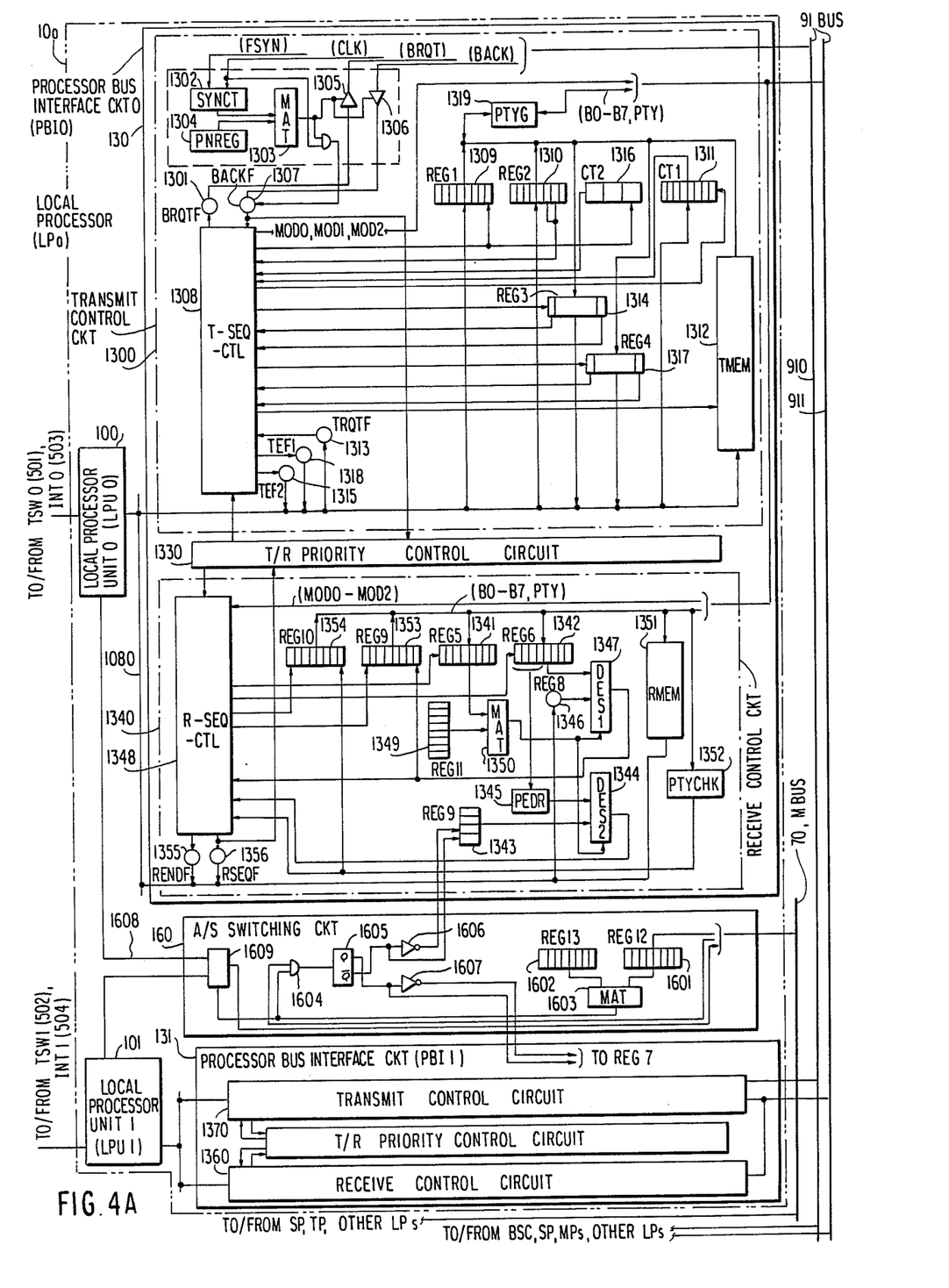
FIGS. 4A and 4B illustrate detailed structures of the local processor, main processor and bus controller shown in FIG. 1.
Figure 4B:
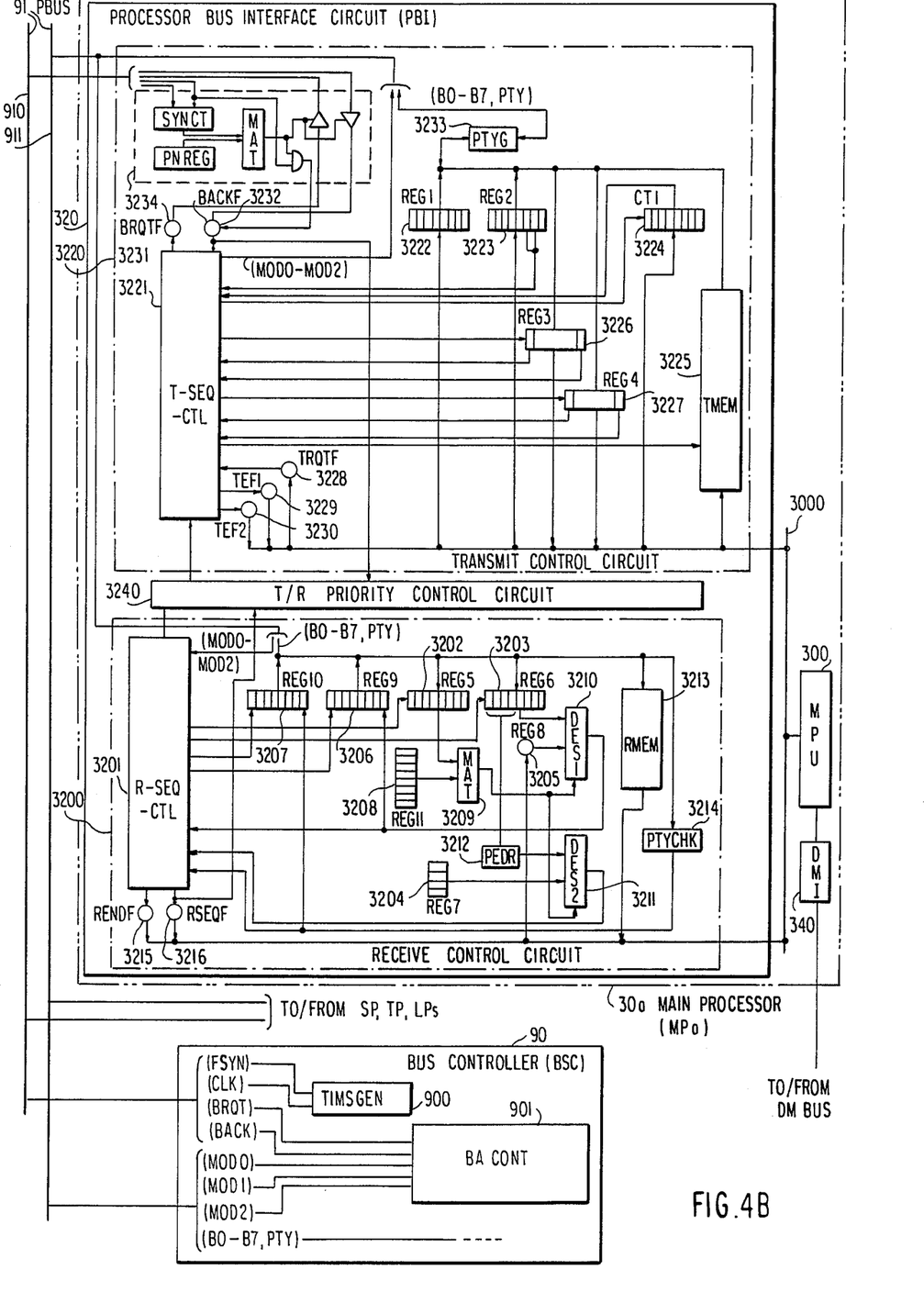

Now, referring to FIGS. 1, 4A and 4B, the method by which access to the processor bus (PBUS) 91 is gained will be described. The bus controller (BSC) 90 constantly sends by way of control lines 910 of the bus 91, clock signals (CLK) and frame synchronization signals (FSYN), generated in a timing signal generator (TIMSGEN) 900, to all the processors using the bus 91, including 10a to 10x, 10y, 20, 30a to 30n and 40. The BSC controller 90 assigns one time slot for a length of time corresponding to each pulse of the CLK signal present in one frame of time between two FSYN signals. For instance, when the No. 0 LPU0 unit 100 of the LP processor 10a, having the processor number "48 (00110000)" (see FIG. 2), is to gain access to the bus, this unit 100 first sets a bus request flag (BRQT) in a bus request flip-flop (BRQTF) 1301 by controlling the transmit sequence controller (T-SEQ-CTL) 1308 of the No. 0 PBI0 circuit 130. The eight-bit synchronous counter (SYNCT) 1302 of the PBI0 circuit 130 counts up, in synchronization with the FSYN signal, the CLK signals supplied from the TIMSGEN generator 900. A matcher (MAT) 1303 compares the count of the SYNCT counter 1302 with a preset value in a processor number register (PNREG) 1304 and, if it finds them identical, opens the gates of a cable driver 1305 and a cable receiver 1306. This causes the BRQT flag, set in the BRQTF flip-flop 1301, to be transmitted to the BSC controller 90 via the control lines 910. The BSC controller 90, having received this BRQT flag at its bus access control circuit (BACONT) 901, uses a mode signal (MOD0, MOD1 and MOD2), to be described in detail later on, to determine whether or not the data lines 911 of the bus 91 are engaged. As a result, if the data lines 911 are found unengaged, the BSC controller 900 will send from the BACONT circuit 901 a bus-accessible signal (BACK) in the 48th time slot. The PBI0 circuit 140 of the LP processor 10a will then receive the BACK signal at a bus-accessible flip-flop (BACKF) 1307 from the control lines 910 via the cable receiver 1306, and upon recognition of this reception by the T-SEQ-CTL controller 1308 via the LPU0 unit 100, access to the bus is gained. As will be described in detail later on, information transfer to the called processor via the data lines 911 is thus achieved.

Next, with reference to FIGS. 1, 4A, 4B, 5A and 5B, will be described a case in which call processing is performed, more particularly dial tone connection processing with call detection. Now, if the LP processor 10a is to operate with its No. 0 LPU0 unit 100 in the "ACT" state and its No. 1 LPU1 unit 101 in the "STBY" state, when the SUB station 508 associated with the TSW switch 50a initiates a call, this state transition will be detected by the LPU0 unit 100 of the LP processor 10a via the LC circuit 505 and the INT0 circuit 503. This causes the LPU0 unit 100 to make a dial tone connection processing demand upon the MP processors 30a to 30n. In this process, first, the LPU0 unit 100, which is currently in the "ACT" state in the LP processor 10a, enters the processor number assigned to the called processor (shown in FIG. 2) into a register (REG1) of the transmit control circuit 1300 of the PBI0 circuit 130 through an internal bus 1000. This unit 100 also enters the processor-selection-condition-information for the called processor (shown in FIG. 3) into a register (REG2) 1310, the quantity of data to be transferred into a sequence counter (CT1) 1311, and the data to be transferred into a transmission memory (TMEM) 1312. In this example it will be assumed that the first group of eight MP processors 30a to 30a+7 (not shown) out of the sixteen MP processors 30a to 30n are group-designated as the called processors, and that the selection condition is that an idle processor among this first group of MP processors be once designated. Therefore, in the REG1 register 1309 is set the representative processor number "00010000" (B7 to B0) of the first group of MP processors, and in the REG2 register 1310, information on the selection condition information "01010010" (B7 to B0) is set. Further the LPU0 unit 100 sets a transfer request flag (TRQT) in a transfer demand flip-flop (TRQTF) 1313 (step S1 shown in FIG. 5A). The T-SEQ-CTL controller 1308, upon detection of the TRQT flag set in the TRQTF flip-flop 1313, sets the BRQTF flip-flop 1301, and begins a procedure to gain access to the bus (step S2). Upon gaining access to the bus by the above described method, the T-SEQ-CTL controller 1308 sets the operating mode for search (steps S3 and S4). In this search mode, a three-bit mode signal "MOD0=0, MOD1=1, MOD2=0" from the controller 1308 is supplied to the data lines 911 (step S5). The controller 1308 also feeds the called processor number "0010000" set in the REG1 register 1309 as timed by a first search mode clock (SMCK1) to the data lines 911 of the PBUS bus 91. This processor number is transmitted to all the processors except the own transmitting processor (step S6). In each processor, for example in the MP processor 30a, the receive sequence controller (R-SEQ-CTL) 3201 of the receive control circuit 3200 compares the received bits with its own address using a matcher (MAT) 3209. Thus, the called processor number "00010000", entered into a register (REG5) 3202 in response to the first search mode clock (SMCK1), is compared with the processor number "00010000" of this processor, preset in another register (REG11) 3208 (steps R1 and R2 shown in FIG. 5B). In the processor 30a, whose number has been confirmed to agree with the received number, gate open signals are sent from the matcher 3209 to decision circuits (DES1 and DES2) 3210 and 3211. At the timing of a second search mode clock (SMCK2), selection-condition-information "01010010", set in the REG2 register 1310 of the calling party's LP processor 10a is supplied to the data lines 911 (step S7), and is stored in a register (REG6) 3203 of the called party's MP processor 30a (step R3). In the receive control circuit 3200 of the PBI circuit 320 of the MP processor 30a is provided a four-bit register (REG7) 3204, in which the operation-state-information (processor-selection-condition-information) "0101" (B7 to B4) of its own processor unit (MPU) 300 is stored in a fixed manner. Therefore, the selection-condition-information "0101" (B7 to B4) entered into the REG6 register 3203 and the state information "0101" set in the REG7 register 3204 are compared with each other by the DES2 circuit 3211 (step R4). Since each of the MP processors 30a to 30n is structured to have a single processor unit, there is no designation of "#1" or "STBY". However, in case the selection condition information (B7 to B4) to be entered into the REG6 register 3203 is inputted by mistake, a priority encoder (PEDR) 3212 gives the priority order of B4>B5>B6>B7 to the four-bit selection-condition information, and lets the DES2 circuit 3211 make a decision. If, as a result of said comparison, the selection-condition-information (B7 to B4) and the state information are found in agreement with each other, condition-agreement-information will be entered from the DES2 circuit 3211 to the R-SEQ-CTL controller 3201, or, if they are found in disagreement, condition-disagreement-information will be entered (steps R5 and R6). In the B3 bit of the REG6 register 3203 is registered idle/busy-designation-information "0". If the MPU unit 300 of the MP processor 30a is unengaged, a register (REG8) 3205 will be indicating this idle state by a "0", so that the DES1 circuit 3210 will enter condition-agreement-information into the R-SEQ-CTL controller 3201, and the subsequent data can be received. If unit 300 is engaged, the REG8 register 3205 will be indicating this busy state by a "1", and the DES1 circuit 3210 will enter condition-disagreement-information into the R-SEQ-CTL controller 3201, and the subsequent data cannot be received (steps R4, R5 and R6).

Figure 5A:
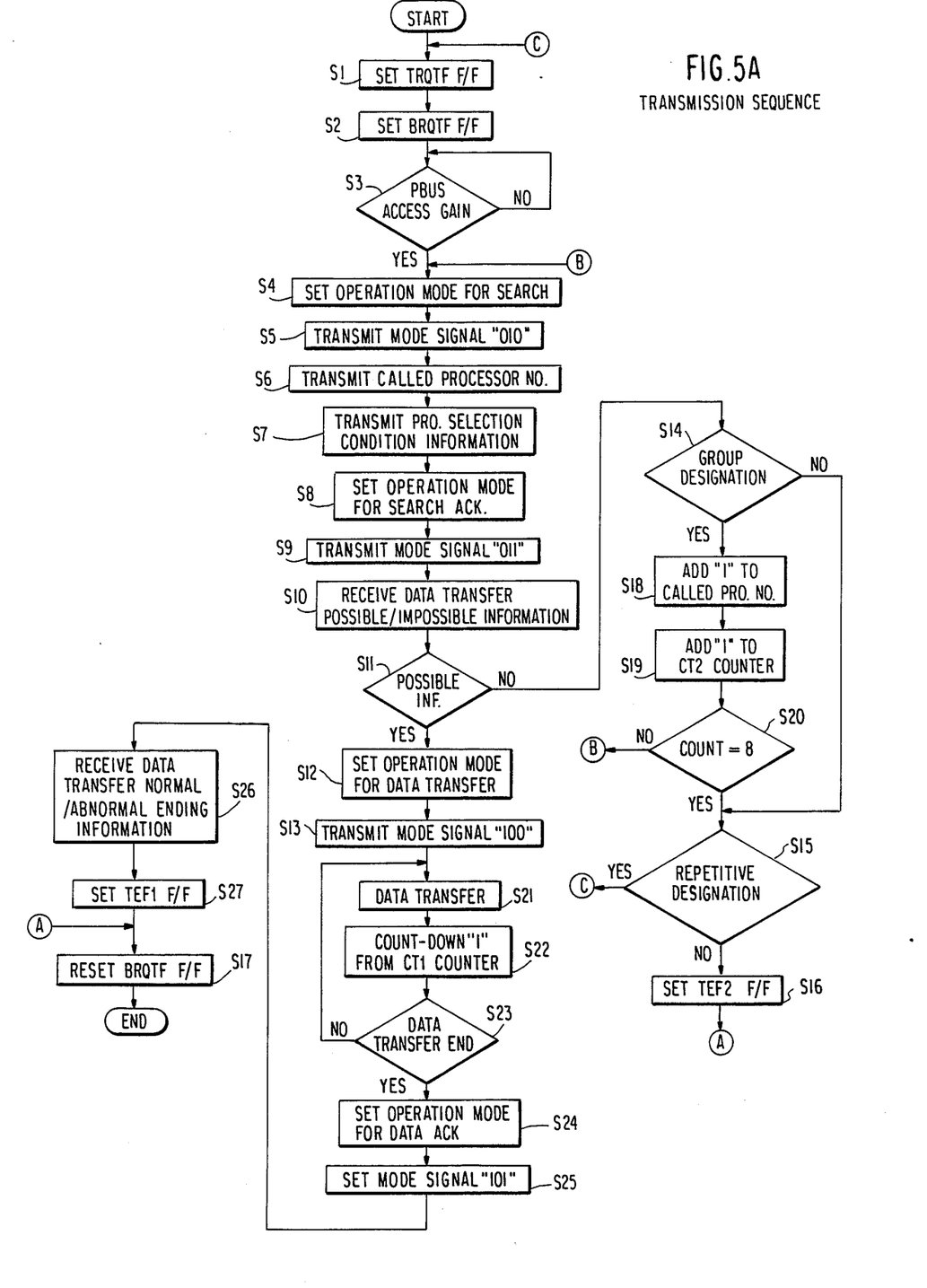
FIGS. 5A and 5B show the sequences of transmission and reception, respectively, by the processors.
Figure 5B:
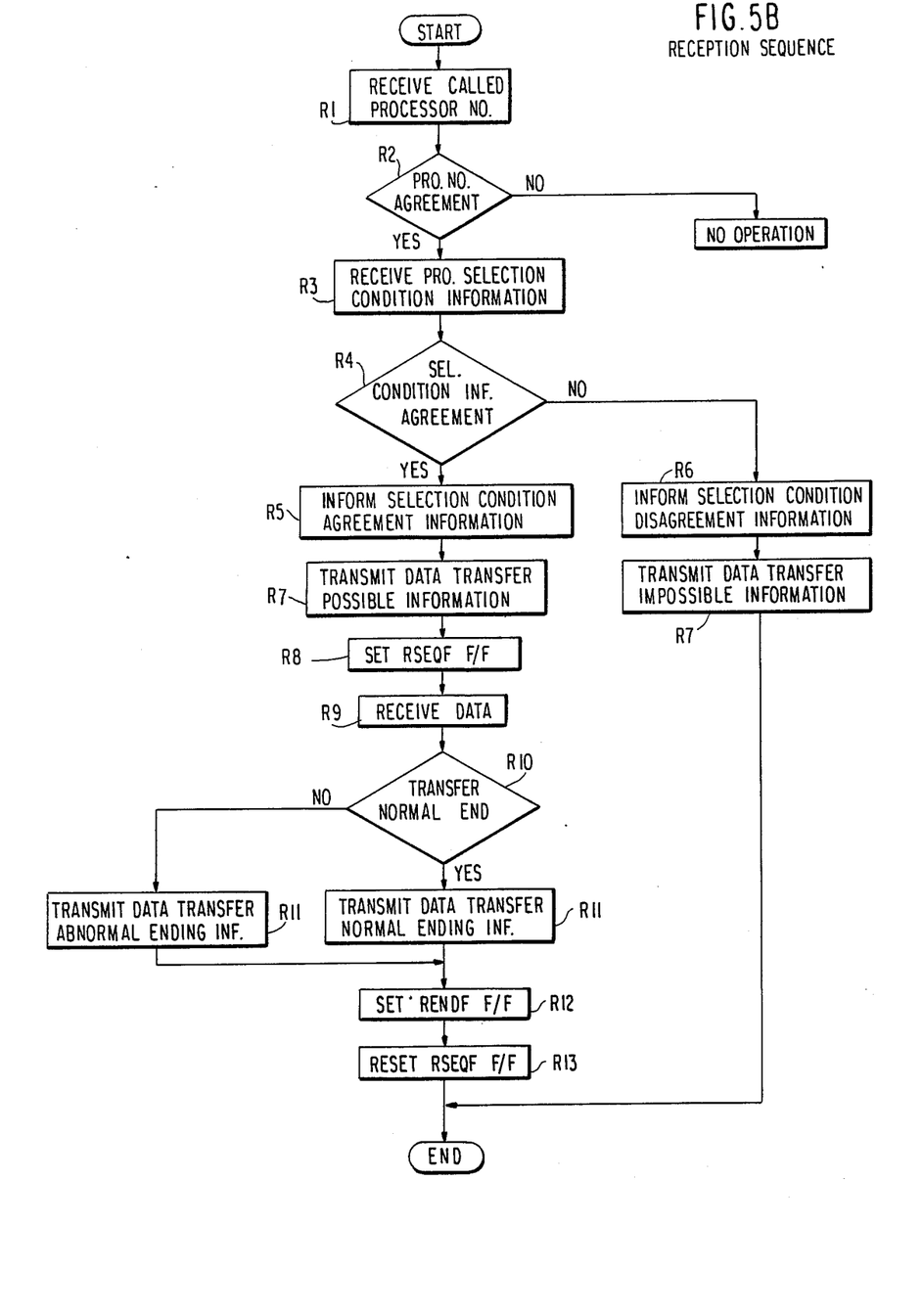

As the operating mode is set for search acknowledgment in the calling processor (LPa) 10a, a search ACK mode signal "011" is sent from the T-SEQ-CTL controller 1308 (steps S8 and S9). The R-SEQ-CTL controller 3201 of the MP processor 30a, having received this mode signal via the data lines 911, sends data-transfer-possible/impossible-information from a register (REG9) 3206 to the LP processor 10a via the data lines 911 (step R7). If condition-agreement-information has been put in the R-SEQ-CTL controller 3201, the controller 3201 sets a receive indication flag (RSEQF) into a RSEQF flip-flop 3216 (step R8). The transmit control circuit 1300 in the PBI0 circuit 130 of the processor 10a receives the data-transfer-possible/impossible-information in a register (REG3) 1314 (step S10). The information received in the REG3 register 1314 is entered into the T-SEQ-CTL controller 1308 for discrimination (step S11). If this data constitutes data-transfer-possible-information "0", the sequence will shift to the data transfer mode (steps S12 and S13). If this data is identified as data-transfer-impossible-information "1", the content of the B1 bit of the REG2 register 1310 indicates the single designation and the content of the B2 bit of the register 1310 indicates the one-time designation, the T-SEQ-CTL controller 1308 will set a transfer incomplete ending flag flip-flop (TEF2) 1315, and reset the BRQTF flip-flop 1301 to end the sequence (steps S14, S15, S16 and S17). However, since in this instance the calling party's LP processor 10a has sent processor-selection-condition-information for group designation of the called party's first group of MP processors, if the information received in the REG3 register 1314 is identified as data-transfer-impossible-information, the T-SEQ-CTL controller 1308 will add "1" to the three least important bits (B1 to B3) of the REG1 register 1309 (step S18). This "1" addition is also carried out in a three-bit counter (CT2) 1316 at the same time (step S19). As the first called processor (MP) whose designation was indicated by group designation was found busy, these operations act to designate the next processor in the same group. The T-SEQ-CTL controller 1308, after that, will again set the operating mode for search, and will repeat the operation described above. Whereas this sequence is to be repeated until an idle MP processor is selected and data transfer is achieved thereto, when the CT2 counter 1316 outputs a count of "8", it will mean that every MP processor of the first group has been tried but none can be raised (step S21). In this case, the T-SEQ-CTL controller 1308 sets the transfer incomplete ending flag flip-flop (TEF2) 1315, resets the BRQTF flip-flop 1301, and ends the processing. Thereafter, the LPU0 unit 100 of the LP processor 10a will attempt reactuation, considering the average retention period and average waiting period of the MP processors.

Let it be assumed that the processor 30a, out of the first designated group of MP processors, has been raised. The T-SEQ-CTL controller 1308 of the LP processor 10a, upon receiving data-transfer-possible-information in the search acknowledgement mode, shifts the operating mode to data transfer, and sends a mode signal "100" from the T-SEQ-CTL controller 1308 to the data lines 911 (steps S12 and S13). It then transfers data to the transmit memory (TMEM) 1312 according to the quantity of data to be transferred, set in the CT1 counter 1311 (step S21). The CT1 counter 1311 is counted down by "1" every time one byte of data is transferred (step S22). When the count reaches "0", the T-SEQ-CTL controller 1308 sets the operating mode for data acknowledgement, represented by the mode signal of "101" (steps S23, S24 and S25). To the data transferred from the TMEM memory 1312 is added a parity bit by a parity generator 1319. The transferred data, after being stored in a receive memory (RMEM) 3213 in the receive control circuit 3200 of the MP processor 30a, is read by an MPU unit 300 for processing (step R9). In the data acknowledgment mode, a parity check circuit (PTYCHK) 3214 in the receive control circuit 3200 of the MP processor 30a is constantly checking the parity of transferred data and, if any parity error arises, informs that faulty state to the R-SEQ-CTL controller 3201 and the REG10 register 3207. The R-SEQ-CTL controller 3201 identifies the data transfer normal/abnormal ending state (step R10). Further in the data acknowledgment mode, information on normal or abnormal ending of data transfer is returned to the LP processor 10a from a register (REG10) 3207 of the MP processor 30a (step R11), and this information is set in the REG4 register 1317 of the LP processor 10a (step S26). Thereafter, the T-SEQ-CTL controller 1308 of the LP processor 10a sets a transfer complete ending flag flip-flop (TEF1) 1318, and at the same time resets the BRQTF flip-flop 1301 to end the transmission sequence (steps S27 and S17). In contrast, the R-SEQ-CTL controller 3201 of the MP processor 30a sets the RENDF flip-flop 3215, and at the same time resets the RSEQF flip-flop 3216 to end the reception sequence (steps R12 and R13). The LPU0 unit 100 of the LP processor 10a can acknowledge the state of data transfer completion by monitoring the TEF1 flip-flop 1318 and REG3 register 1314 or the TEF2 flip-flop 1314 and REG4 register 1317 through the internal bus 1000.

In the above-mentioned processing sequence, where each of the LP processors 10a to 10x and 10y selects one or another of the MP processors 30a to 30n, if the processor number of the MP processor set in the REG1 register 1309 always designates the lowest numbered processor of the first or second group of processors, the lowest numbered MP processor then available will always be selected, with the undesirable result of uneven load distribution on the MP processors. For instance, in the distributed control subsystem, where the SP processor 40 (FIG. 1) is used for system monitoring and conducts periodic troubleshooting, it may be difficult to raise and actuate the lowest numbered MP processor. However, the LP processors 10a to 10y and TP processor 20 in the distributed control subsystem of this preferred embodiment, as can be understood from the structure of the LP processor 10a whose details are representative of the others, can set the initial value of the called MP processor number in the REG1 register 1309 as desired by designation from the LPU0 unit 100. The three least significant bits (B1 to B3) of the REG1 register 1309 constitute a counter rotating from "000" to "111". Therefore, by adding "1" every time a called processor number is newly set in the REG1 register 1309, the MP processor to be designated first can be altered successively. In this way, the above mentioned problem of uneven load distribution can be averted, and instead the loads on the MP processors can be made uniform.

After the foregoing information and data transfer operations from the LP processor 10a to the MP processor 30a have been completed, the MPU unit 300 in the called party's processor 30a receives from the calling party's LP processor 10a, by way of an internal bus 3000, data concerning call initiation, which is stored in the RMEM memory 3213 of the receive control circuit 3200 of the PBI circuit 320. The MPU unit 300 accesses the data memory (DM) 80 via the data memory interface circuit (DMI) 340 and data memory bus (DMBUS) 800 (FIG. 1), and reads out of the DM memory 80 various data such as trunk selection information and idle speech-path information needed for connecting (dial tone connection) the ORT circuit 507 (FIG. 1), which is associated with the TSWy switch 50y and which is in an idle state, to the SUB station 508. Then, the MPU unit 300 begins transmission and reception sequences (shown in FIGS. 5A and 5B) with the LP processor 10y and the TP processor 20 by controlling the transmit control circuit 3220 of the PBI circuit 320. Consequently, the idle ORT circuit 518 is connected to the TSW0 switch 501 of the TSWa switch 50a through the TSW0 switch 511 of the TSWy switch 50y and the HSW0 switch 601 of the HSW switch 60. In this process, the LPy processor 10y, which receives a request to raise the ORT circuit 518 from the MPa processor 30a, uses the busy designation information as the processor selection condition when the processor 10y responds to the receipt of acknowledgement information to the processor 30a.

Next, information and data transfer operations from the MP processor 30a to the LP processor 10a in dial tone connection processing will be described in detail. The MPU unit 300 in the MP processor 30a accesses the data memory (DM) 80 via the data memory interface circuit (DMI) 340 and data memory bus (DMBUS) 800 (FIG. 1), and reads out of the DM memory 80 idle speech-path data of the TSW0 switch 501 needed for connecting the idle ORT circuit 507 to the SUB station 508. Then, the MPU unit 300 begins a sequence of transmissions (shown in FIG. 5A) to the LP processor 10a by controlling the transmit control circuit 3220 of the PBI circuit 320. The T-SEQ-CTL controller 3221 of the MP processor 30a, upon gaining access to the bus, as in the aforementioned case with the LP processor 10a, sends the processor number "00110000 (B7 to B0)" of the LP processor 10a from a REG1 register 3222 to the data lines 911 of the PBUS bus 91 as timed by the first search mode clock (SMCK1) of the search mode. This processor number is entered into the REG5 register 1341 of the PBI0 circuit 130 and the REG5 register (not shown) of the PBI1 circuit 131 in the LP processor 10a, and designates both of the duplicated LP0 and LPU1 units 100 and 101. However, it is alternatively possible to receive in a REG6 register 1342 processor-selection-condition-information "01010100" (B7 to B0) sent from the REG2 3233 of the MP processor as timed by the second search mode clock (SMCK2), to let DES2 circuit 1344 compare this information with operation-state-information preset in REG7 register 1343, and select one or the other LP unit whose agreement is confirmed. Now, the state information set in the REG7 register 1343 of a receive control circuit 1340 is "0101" (B7 to B4), while that set in the REG7 register (not shown) of a receive control circuit 1360 is "1010" (B7 to B4), so that the LPU0 unit 100 is selected. Further, the selection-condition-information (B7 to B4) of the REG6 register 1342 is given the priority order of B4>B5>B6>B7 by a PEDR encoder 1345, and is entered into the DES2 circuit 1344. The selection-condition-information (B3) entered in the REG6 register 1342 is compared by DES1 circuit 1347 with the content of a REG8 register 1346 indicating the idle busy state ("0/1") of the LPU0 unit 100, and condition-agreement/disagreement-information according to the result of comparison is entered into an R-SEQ-CTL controller 1348. The processor number "00110000" (B7 to B0) entered into the REG5 register 1341 and the processor number "00110000" (B7 to B0) preset in a REG 11 register 1349 are compared by a matcher (MAT) 1350 and, if they are found in agreement with each other, a gate open signal will be sent to the DES1 and DES2 circuits 1347 and 1344. At this step, the matcher 1350 holds the content of the processor number's least significant bit B0 after the comparison. This has important relevance to the operation of both of the duplicated LPU0 and LPU1 units 100 and 101 in the "ACT" or "STBY" state.

Among other structural elements of the receive control circuit 1340, an RMEM memory 1351 memorizes data transferred to the MP processor 30a in the data transfer mode, and a PTYCHK circuit 1352 checks the parity bit transmitted together with the transferred data. A REG9 register 1353 stores data-transfer-possible/impossible-information to be transmitted to the MP processor 30a, while a REG10 register 1354 stores data-transfer-normal/abnormal-ending-information to be transmitted to the processor 30a. Meanwhile, the transmit control circuit 3220 of the MP processor 30a has similar structural elements to those of the transmit control circuit 1300 of the LP processor 10a, except that the former has nothing corresponding to the CT2 counter 1316 because it never group-designates other processors. Further, the control circuit 3220 does not employ the structure which adds "1" to the REG1 register 3222 for storing processor-number-information. In the control circuit 3220, a CT1 counter 3224, a TMEM memory 3225, a REG3 register 3226, a REG4 register 3227, a TRQTF flip-flop 3228, a TEF1 flip-flop 3229, a TEF2 flip-flop 3230, a BRQTF flip-flop 3231, a BACKF flip-flop 3232 and a PTYG generator 3233 have functions identical to those of units indicated by identical reference symbols in the transmit control circuit 1300 of the LP processor 10a, respectively. The circuit indicated by the reference numeral 3234 is for requesting and baing access to the processor bus.

Every processor in this embodiment is equipped with a circuit similar to the transmit/receive (T/R) priority control circuits 1330 and 3240, respectively provided in the PBI0 circuit 1300 of the LP processor 10a and PBI circuit 320 of the MP processor 30a, both being representative of other processors in the foregoing description. These circuits 1330 and 3240 perform control so as to give priority to data reception when demands for data transmission and reception simultaneously arise between other processors.

The LP processors 10a to 10x and 10y and TP processor 20 are respectively equipped with act/standby switching circuits (A/S) 160 to 170, 180 and 220. These circuits will be described below with reference to the A/S circuit 160 of the LP processor 10a, which is selected here as representative of the others. The A/S circuit 160 receives a command from the SP processor 40, and switches the duplicated LPU0 and LPU1 units 100 and 101 between "ACT" and "STBY" in a reciprocal way. Thus the A/S circuit 160 receives into a REG12 register 1601 a processor number "00110000" (B7 to B0) sent from the SP processor 40 to the MBUS bus 70. This received number and a processor number "0011000" (B7 to B0) preset in a REG13 register 1602 are compared by a matcher (MAT) 1603 and, if they are found in agreement with each other, the matcher 1603 will supply a gate open signal to an AND circuit 1604. In response to this gate open signal, the AND circuit 1604 enters a switching signal, received from the SP processor 40 via the MBUS bus 70, into a flip-flop 1605. A first signal from the first output terminal ($\overline{Q}$) of the flip-flop 1605 is set, with its logic unchanged, in the B4 bit of the REG7 register 1343 of the receive control circuit 1340 of the PBI0 circuit 130. The first signal, with its logic inverted by an inverter 1606, is set in the B5 bit of the RE7 register 1343. When, as a result, "0" and "1" signals are respectively set in the B4 and B5 bits of the REG7 register 1343, the LPU0 unit 100, which has been in the "ACT" state, is switched to the "STBY" state. Meanwhile, a second signal from the second output terminal (Q) of the flip-flop 1605, which has a logic level opposite that of the first signal, is set in the B4 and B5 bits of the REG7 register (not shown) of the receive control circuit 1360 of the PBI1 circuit 131, that entered into the B5 bit being inverted in logic by an inverter 1607. As a result, "1" and "0" signals are respectively set in the B4 and B5 bits, and the LPU1 unit 101, which has been in the "STBY" state, is switched to the "ACT" state.

As hitherto described, according to a command from the SP processor 40, the A/S circuit 160 can switch and set the operating states of duplicated processor units as desired. Normally, the SP processor 40 is successively scanning, via the MBUS bus 70, information on various problems or faults in the processors connected to the MBUS 70 and PBUS bus 91. For instance, if the SP processor 40 scans the LPU0 unit 100 when the unit is setting a trouble flag in a register 1609 through a line 1608, the pertinent trouble information (ALM) will be transmitted to the SP processor 40 from the register 1609 via the MBUS bus 70. In such an event, the SP processor 40 will send a switching command to the corresponding processor.

Other alternatives and modifications to the above-mentioned embodiment can be made within the scope of the invention defined by the appended claims.

What is claimed is:

1. A distributed control type electronic switching system, comprising:
   a plurality of speech-path switches respectively provided with duplicated first and second speech-path switching means operable simultaneously;
   a line circuit and trunk circuits associated with each of said speech-path switches;
   a distributed first plurality of processors respectively provided with duplicated first and second processing means connected to said first and second speech-path switching means of each of said speech-path switches and to said line circuit and said trunk circuits associated with said corresponding speech-path switch, said first and second processing means being complementarily arranged in active and standby operation states, duplicated first and second interface means respectively connected to said first and second processing means, and means for reciprocally switching said active and standby operation states of said first and second processing means;
   a distributed second plurality of processors respectively provided with single processing means and single interface means for controlling various connections of said speech-path switches and said line circuits and said trunk circuits; and
   transfer means connected to said first and second interface means of each of said first plurality of processors and said single interface means of each of said second plurality of processors for transmitting information and data between said first and said second plurality of processors;
   each of said interface means of said first and said second plurality of processors comprising:
   first storage means for storing own-processor-number-information; second storage means for storing own-processor-operation-state-information; third storage means for storing processor-number-information of a called party received from a calling party via said transfer means; fourth storage means for storing processor-selection-condition-information of said called party received from said calling party via said transfer means; first comparison means for comparing said information stored in said first and third storage means with each other; second comparison means for comparing said information stored in said second and fourth storage means with each other; means for transmitting one of data-transfer-possible-information and data-transfer-impossible-information to said calling party via said transfer means in dependence upon comparison results of said first and second comparison means; means for transmitting one of data-transfer-normal-ending-information and data-transfer-abnormal-ending-information and for indicating a data-transfer-ending-state to a corresponding processing means in dependence upon the normality of data transmitted from said calling party; fifth storage means for storing processor-number-information for designating said called party; sixth storage means for storing processor-selection-condition-information for selecting said called party; seventh storage means for storing one of said data-transfer-possible-information and said data-transfer-impossible-information sent back from said called party; eighth storage means for storing one of said data-transfer-normal-information and said data-transfer-abnormal-information sent back from said called party; means for enabling data transmission upon identifying data-transfer-possible-information stored in said seventh storage means; and means for indicating a data-transfer-ending-state in said corresponding processing means upon identifying one of said data-transfer-normal-ending-information and said data-transfer-abnormal-ending-information stored in said eighth storage means.

2. An electronic switching system as claimed in claim 1, wherein each of said interface means of said first plurality of processors further comprises: means operating in response to said processor-selection-condition information when said information designates a group of said second plurality of processors, to sequentially designate ones of said group of processors until one of said groups of processors indicates a data-transfer-possible condition.

3. An electronic switching system as claimed in claim 2, further including means for sequentially incrementing the value held in said fifth storage means, to sequentially designate ones of said group of processors, upon receipt by said seventh storage means of data-transfer-impossible information.

4. An electronic switching system as claimed in claim 3, further including counter means for maintaining a count of the number of processors sequentially designated and responding with data-transfer-impossible-information, and, upon said number equalling the number of processors constituting said group, generating a signal enabling temporary suspension of attempts to achieve data-transfer with said processors constituting said group.

5. An electronic switching system as claimed in claim 1, further including means for monitoring operations of said first plurality of processors to detect a fault in one or ones of said first plurality of processors, said monitoring and detecting means including means for transmitting a switching command signal to said operation state switching means, said operation state switching means being coupled between said first and second interface means.

6. An electronic switching system as claimed in claim 2, further including means for controlling the sequential designation of ones of said group of said second plurality of processors, so as to eliminate prioritization in designation among members of said group.

7. A distributed control type electronic switching system, comprising:

a plurality of speech-path switches respectively provided with duplicated first and second speech-path switching means operable simultaneously; line and trunk circuits associated with each of said speech-path switches;

a distributed first plurality of processors respectively provided with duplicated first and second processing means connected to said first and second speech-path switching means of each of said speech-path switches and to said line and trunk circuits associated with said corresponding speech-path switch, said first and second processing means being complementarily arranged in active and standby operation states;

means for reciprocally switching said active and standby operation states of said first and second processing means;

first and second interface means respectively connected to said first and second processing means;

a distributed second plurality of processors respectively provided with single processing means and single interface means for controlling various connections of said speech-path switches and said line circuits and said trunk circuits; and transfer means connecting at least said first and second interface means of each of said first plurality of processors and said single interface means of each of said second plurality of processors, for transmitting information and data between said first and said second plurality of processors;

each of said interface means of said first and said second plurality of processors comprising:

first storage means for storing processor-number-data for the processor associated with said interface means; second storage means for storing operation-state-information for said associated processor; third storage means for storing processor-number-information of a called party as received from a calling party via said transfer means; fourth storage means for storing processor-selection-condition-information of said called party as received from said calling party via said transfer means; first comparison means for comparing the information stored in said first and third storage means; second comparison means for comparing the information stored in said second and fourth storage means; means for transmitting either a data-transfer-possible indication or a data-transfer-impossible-indication to said calling party via said transfer means in dependence upon comparison results of said first and second comparison means; fifth storage means for storing processor-number-information for designating said called party; sixth storage means for storing processor-selection-condition-information for selecting said called party; seventh storage means for storing one of said data-transfer-possible-indication and said data-transfer-impossible-indication sent back from said called party; and means for enabling data transmission upon identifying data-transfer-possible-information stored in said seventh storage means.

* * * * *

UNITED STATES PATENT AND TRADEMARK OFFICE
CERTIFICATE OF CORRECTION

PATENT NO. : 4,710,952
DATED : December 1, 1987
INVENTOR(S) : Tsuneo Kobayashi

It is certified that error appears in the above-identified patent and that said Letters Patent is hereby corrected as shown below:

Column 5, lines 12 and 13, after "states as" delete "the occurrence result of detecting a of trouble" and insert --a result of detecting the occurrence of trouble--.

Column 7, line 65, delete " "0010000" " and insert --"00010000"--.

Column 10, line 35, delete "lowest numbered" and insert --lowest-numbered--.

Column 12, line 30, delete "baing" and insert --gaining--.

Column 12, line 55, delete "0011000" and insert --"00110000"--.

Signed and Sealed this

Ninth Day of August, 1988

Attest:

DONALD J. QUIGG

Attesting Officer

Commissioner of Patents and Trademarks